March 7, 1967  J. L. ROSHALA  3,308,411
PRESSURE TRANSDUCER FOR USE IN EXTREME TEMPERATURE
AND RADIOACTIVE ENVIRONMENTS
Filed April 6, 1964
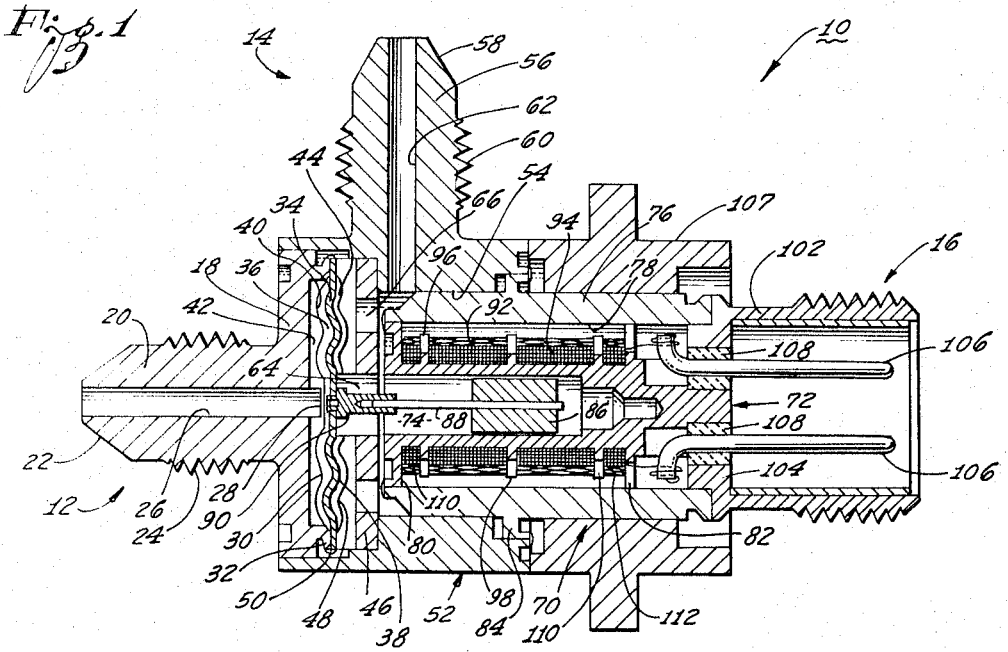
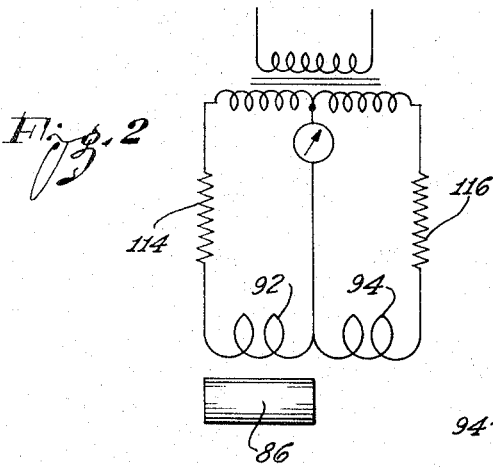
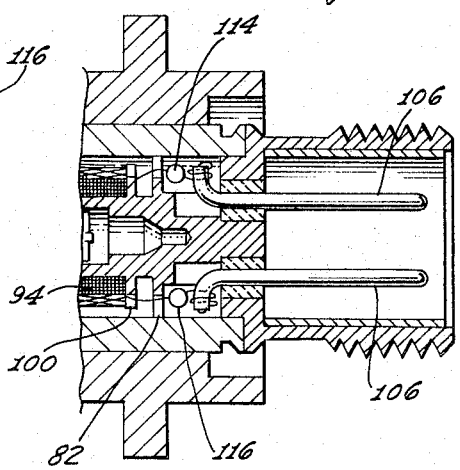
INVENTOR:
John L. Roshala
By Smyth, Roston & Pavitt
Attorneys United States Patent Office 3,308,411
Patented Mar. 7, 1967

3,308,411
PRESSURE TRANSDUCER FOR USE IN EXTREME TEMPERATURE AND RADIOACTIVE ENVIRONMENTS
John L. Roshala, Baldwin Park, Calif., assignor to Physical Sciences Corporation, Arcadia, Calif., a corporation of California
Filed Apr. 6, 1964, Ser. No. 357,516
6 Claims. (Cl. 336—30)

The present invention relates to transducers and, more particularly, to means for measuring the difference between the pressures of two fluids and providing an electrical signal proportional to the difference.

There are a wide variety of pressure sensitive devices available for measuring the differences between two pressures. In one form of such devices, an electromechanical transducer is included within the pressure sensitive device so as to be responsive to a physical or mechanical movement produced as a result of the pressure differential. The transducer is then effective to produce an electrical signal that is a function of the amount of movement.

Pressure sensitive devices and transducers of this general type have been reasonably satisfactory for most applications. However, under some circumstances they have not been sufficiently reliable or accurate, particularly where the device is used to measure pressure differences over a wide range of operating conditions and under severe environmental conditions. For example, when the pressure sensitive devices have been required to operate at either an extremely high temperature or at an extremely low temperature or to operate over an extremely wide range of temperatures, certain nonlinear characteristics have become very pronounced and have produced errors of excessive magnitude.

In addition, when the prior art pressure sensitive devices have been employed, in some types of severe environmental conditions such as in areas of high nuclear activity, the characteristics of one or more portions of the transducer become nonlinear so as to produce erroneous signals or else malfunction and fail. As a consequence, the electrical signals produced by the pressure sensitive devices previously available have been nonlinear and unpredictable in their response under some conditions. As a result, such pressure sensitive devices have been entirely unsatisfactory for use over extreme operating ranges and in extreme environments and especially where high degrees of accuracy are required.

According to the present invention, pressure sensing means are provided which will overcome the foregoing difficulties. More particularly, a pressure sensing device is provided whch includes a transducer that provides an electrical signal that is a very linear function of a pressure differential over an extreme wide range of operating conditions and in extremely adverse environments.

More particularly, a pressure sensitive device is provided which may be interconnected with sources of two different pressures so as to sense the difference between the two pressures. The pressure sensitive device includes a transducer which has the various portions thereof constructed and arranged so as to be extremely stable under all operating conditions and in a wide variety of environments. As a result, the pressure sensitive device may be employed over an extremely wide range of operating conditions and environments and still produce an electrical output signal that is a very linear function of the pressure differential.

These and other features and advantages of the present invention will become readily apparent from the following detailed description of the present invention, particularly when taken in connection with the accompanying drawings wherein like reference numerals refer to like parts, and wherein:

FIGURE 1 is a cross-sectional view of a pressure sensitive device embodying one form of the present invention;

FIGURE 2 is a schematic diagram of the electrical portion of the pressure sensitive device of FIGURE 1; and FIGURE 3 is a fragmentary cross-sectional view of a portion of a pressure sensitive device embodying another form of the present invention.

Referring to the drawings in more detail, the present invention is particularly adapted to be embodied in a pressure sensitive device 10 for measuring the difference between the pressures of two separate and distinct fluids and to provide an electrical signal having a magnitude proportional to the magnitude of the difference. The fluids which are to have their pressures compared may be of any desired variety such as for example gases or liquids or a gas and a liquid. However, the present pressure sensing device 10 is especially suited for use in measuring the pressure differential of a pair of fluids that may have very low temperatures such as in the so-called cryogenic region. Alternatively, the pressure sensitive device 10 may be employed to measure pressure differentials of fluids having high temperatures in the regions of a thousand degrees Fahrenheit or higher, such as encountered when employing liquid NaK (sodium potassium) and similar fluids. Also, the pressure sensitive device may be used in nuclear reactors and other equipment having large amounts of radio activity.

The present pressure sensitive device 10 includes a first inlet 12 which is adapted to be connected to a source of a first fluid whereby the pressure of the first fluid may be carried to the inlet 12. In addition, a second inlet 14 may be provided for being interconnected with a source of the second fluid whereby the pressure of the second fluid may be carried to this inlet 14. An electrical outlet 16 may be provided for supplying electrical signals which are proportional to the difference between the pressures at the two inlets 12 and 14.

More particularly, the first inlet 12 includes a body 18 having a nipple 20 extending from one end thereof. The end 22 of the nipple 20 may be tapered so as to fit into a suitable coupling on the end of a hose or tubing leading to a source of the first pressure. The exterior of the nipple 20 may be threaded 24 so as to receive a connector that will retain the hose or tubing sealed against the tapered end 22. An axial passage 26 in the nipple 20 communicates with the interior of the hose or tubing and receives the first fluid. The passage 26 extends completely through the body 18 and forms an opening 28 in the face 30 on the opposite side of the body 18.

The body 18 includes a portion which projects radially outwardly from the nipple 20 substantially normal to the axis of the passage 26. The face 30 of the body 18 is disposed substantially normal to the axis of the passage 26 and concentric with the opening 28 formed by the end passage 26. A substantially cylindrical rim 32 extends concentrically around the face 30 substantially concentric with the opening 28.

A flexible diaphragm 34 may be seated upon this rim 32 so as to be substantially parallel to the face 30. The diaphragm 34 is spaced from the face 30 whereby a clearance space or pressure chamber 36 will be formed. This space 36 communicates with the passage 26 inside of the nipple 20. Thus, the pressure in the chamber 36 will be equal to the pressure of the first fluid and the diaphragm 34 has a force acting thereon proportional to the pressure in chamber 36.

Normally, the diaphragm 34 is a flexible metal membrane which can be distorted normal to the plane thereof in response to the pressure differential across the diaphragm 34. Although the diaphragm 34 may be a substantially plane member, it has been found desirable for the diaphragm 34 to include a plurality of corrugations 38. These corrugations 38 extend circumferentially around the diaphragm 34 substantially concentric with the center thereof so as to increase the strength of the diaphragm 34 against bending about a line which extends thereacross. In addition, it will permit the center of the diaphragm 34 to move in a direction normal to the plane of the rim 32. By a proper choice of materials and dimensions, the diaphragm 34 may be provided with a spring rate that will oppose the deflection of the diaphragm 34 whereby the center of the diaphragm 34 will move through a predetermined displacement in response to the normal pressure differentials to be measured.

It has been found desirable for the face 30 on the inner side of the body 18 to be closely spaced to the diaphragm 34 so as to reduce the volume of the pressure chamber 36. It has also been found desirable for the face 30 to be positioned so that the diaphragm 34 will engage the face 30 so as to limit its travel before the diaphragm 34 is deflected enough to cause permanent deformations. To this end the face 30 may include a series of undulations 40 that correspond to the corrugations 38 in the diaphragm 34. The undulations 40 in the face 30 are spaced a sufficient distance from the diaphragm 34 to permit the diaphragm 34 to be deflected laterally through its normal operating range without limiting its travel. However, as the diaphragm 34 is being deflected beyond its safe operating range, it will engage substantially the entire face 30 and thereby be protected from permanent damage. A plurality of radial slots 42 may be recessed into the surface of the face 30 so as to communicate with the inner end of the passage 26. This will permit the fluid to flow radially inwardly and outwardly from the passage 26 even when the diaphragm 34 is against the face 30.

A retainer 46 is provided for securing the diaphragm 34 in position and forming a second pressure chamber 44 on the opposite side of the diaphragm 34. The retainer 46 includes an annular seat that registers with the rim 32 formed on the first member 18 and engages the periphery of the diaphragm 34. The retainer 46 may also include a series of undulations 48 that correspond to the corrugations 38 in the diaphragm 34. As a consequence, when the diaphragm 34 is deflected to the right as seen in FIGURE 1, it will come to rest on the surface before it is deflected enough to be damaged.

In order to secure the retainer 46, diaphragm 34 and the first member 18 together, suitable means are provided. Although this may be accomplished by any suitable means, it has been found that welding and particularly heli-arc welding is well suited for this purpose. This will be effective to provide an hermetic seal 50 that will prevent the leakage of any fluid and also will insure the pressure chambers 36 and 44 on the opposite sides of the diaphragm 34 being maintained entirely separate and distinct from each other.

An outer housing 52 may be provided which includes a substantially cylindrical body having a passage 54 extending axially therethrough. One end of this passage 54 may be enlarged and shaped to just fit over the exterior of the retainer 46 and the body 18. The housing 52 may be secured in this position by any suitable means. However, it is preferable for the fastening to be accomplished by any means such as welding that will insure an hermetic seal.

The second inlet 14 may be provided on this housing 52. The inlet 14 includes a nipple 56 that extends radially from the housing 52. The end 58 of the nipple 56 is tapered so as to fit into the end of a suitable hose or tubing leading to a source of the second pressure. The exterior may be threaded 60 to receive a suitable connector that will retain the end of the hose or tubing sealed onto the nipple 56.

A passage 62 extends axially through the nipple 56 and communicates with the exterior of the tubing or hose while the opposite end opens into the axial passage 54. As a consequence, the second pressure will be carried into the passage 62. A center opening 64 and a series of apertures 66 may be provided in the retainer so as to allow the fluid to enter into the second chamber 44.

It may thus be seen that when the first and second inlets 12 and 14 are interconnected with sources of the first and second fluids, the two fluids will be present in the two chambers 36 and 44 and will create opposed forces on the opposite sides of the diaphragm 34. As a consequence, there will be a net force acting on the diaphragm 34 which is a function of the difference between the two pressures. Since the diaphragm 34 is of a resilient nature and has a predetermined spring rate, it will be deflected to the right or left by a distance that is a function of the pressure differential. In the event of an abnormal pressure differential, the diaphragm 34 will move laterally against the undulations 40 or 48 whereby the amount of travel of the diaphragm 34 will be restricted to a safe operating range for the diaphragm 34.

In order to sense the amount of deflection of the diaphragm 34 and provide an electrical signal proportional thereto, a suitable transducer 70 is provided. In the present instance, this transducer 70 includes an elongated bobbin 72 having a passage 74 extending axially inwardly from one end thereof. The passage 74 dead ends and does not pass entirely through the bobbin 72. The bobbin 72 is secured in position on the housing 52 with the open end of the passage 74 substantially aligned with the opening 64 in the center of the retainer 46. The passage 74 is preferably substantially normal to the plane of the diaphragm 34 and aligned with the center of the diaphragm 34.

In order to secure the bobbin 72 in position, a suitable bushing 76 may be provided. The bushing 76 includes a passage 78 that extends axially through the bushing 76. This passage 78 has a diameter large enough to permit radial flanges 80 and 82 on the exterior of the bobbin 72 to slide through the passage 78. The inner end of the bushing 72 may be arranged so the flange 80 just registers with the end of the bobbin 72 when it is positioned in the passage 78. The end of the bushing 76 and the flange 80 may be secured together by means of an hermetic seal such as a weld.

The exterior of the bushing 76 is substantially cylindrical and has a diameter that will permit it to just fit inside of the passage 54 through the housing 52. The exterior of the bushing 76 may also include a flange 84 that fits into an annular recess in the end of the housing 52. This flange 84 may be secured in this recess by means of an hermetic seal such as a weld. It may thus be seen that, although the chamber 44 opens into the passage 54, the chamber 44 will be hermetically sealed.

In addition, the transducer 70 may include a suitable slug 86 which is slidably disposed within the passage 74 so as to be free to move axially thereof. This slug 86 is operatively interconnected with the diaphragm 34 by means of an elongated pin 88. One end of the pin 88 extends through the slug 86 and is secured therein as a result of a press fit. The opposite end of the pin 86 is attached to a connector 90 in the center of the diaphragm 34. It will thus be seen that as the diaphragm 34 is deflected one way or the other by the pressure differential, the slug 86 will be moved axially through the bobbin 72 in direct relationship to the amount of deflection.

In order to facilitate sensing the position of the slug 86 or the amount of displacement thereof, the slug 86 may have magnetic characteristics that are readily detectable. For example, the slug 86 may include a high magnetic permeability to magnetic flux. In order to insure a linear output signal, the magnetic permeability of the slug 86 should remain substantially constant at all operating conditions and in any type of environment where the sensing device 10 is to be employed. Although there are a large number of materials that may be employed for this purpose, it has been found that magnetic stainless steels are suitable for this purpose. By way of example, stainless steels such as the IASI 400 series are particularly well suited.

One particular illustrative embodiment of a material of this type includes by weight 12 to 14 percent of chromium, 0.5 percent nickel, 1.25 percent manganese, 1 percent silicon, 0.15 percent carbon and the rest of iron. The stainless steel may also include a minimum of 0.07 percent by weight of phosphorus, sulfur or selenium, or a maximum of 0.06 percent by weight of zirconium or molybdenum.

Such a steel is readily machinable and easily worked. In addition, the magnetic characteristics of such a material are substantially constant over a wide range of conditions. However, if the pressure sensing device 10 is to be used in extreme conditions, it has been found desirable to stabilize the material by removing any crystalline stresses present in the slug 86. By proper stabilization, the material may have a variation of magnetic characteristics of less than 0.001 percent per degree Fahrenheit throughout a temperature range from −320° F. to in excess of 1000° F. Moreover, the Curie temperature of the material may be increased so that the material is not particularly susceptible to a radioactive environment.

In order to form the slug 86 and stabilize it, the following process or its equivalent may be followed. An oversize blank for making the slug 86 may be heated to an elevated temperature on the order of 1550° F., and maintained at that elevated temperature for 8 to 10 hours. The blank is allowed to cool to room temperature and is then dropped into liquid nitrogen at −320° F. to −325° F. The blank is allowed to remain in the liquid nitrogen for approximately 15 minutes and then removed and warmed to room temperature. The blank is then heated to approximately 1100° F. for 1 hour and returned to room temperature. The blank is next dropped into liquid nitrogen for another 15 minute interval and then returned to room temperature. The last steps of heating to 1100° F. for one hour and thermal shocking in the liquid nitrogen for an interval of 15 minutes may be repeated one or more times.

At this point, the blank is substantially stabilized. However, it is cut and turned down to remove the surface impurities and locally stressed areas generally present near the surface. The partially formed blank is again heated to 1100° F. for 1 hour, returned to room temperature, thermally shocked by dropping into liquid nitrogen for 15 minutes, and returned to room temperature. This will remove any stresses in the material resulting from the foregoing turning operation. The blank may then be turned down again to just slightly larger than the final diameter required for the particular magnetic slug 86. A cylindrical hole may then be drilled through the slug 86 along its longitudinal axis for the pin 88. The slug 86 is then heated to 1100° F. for 15 minutes, returned to room temperature, and dropped into liquid nitrogen to remove any stresses resulting from the drilling, etc. Finally, the slug 86 is centerless ground to the correct or finished external diameter.

Any of the conventional core materials would oxidize at the foregoing elevated temperatures and would fall apart during the repeated thermoshocks. However, the stainless steels selected for the slug 86 are high temperature materials which do not oxidize at the elevated temperatures. Moreover, the material is readily machinable so that only small stresses are introduced to the material by the machining operation. The initial thermoshock cycles stabilize the dimensions of the slug blank. As a result, the machining operations are performed after the dimensions have been stabilized. A slug 86 produced in accordance with a method such as just described is very stable and will exhibit only very minute changes of magnetic characteristics for temperatures in excess of 1000° F. As a result, the output signal will contain little, if any, error or it will be in a range that can be easily eliminated by suitable compensation.

The position of the slug 86 within the passage 74 is sensed by means of one or more coils disposed on the outside of the bobbin 72. The exterior of the bobbin 72 includes a plurality of baffles 96, 98 and 100 that divide the space between the exterior of the bobbin 72 and the interior of the bushing 76 into a plurality of segments. A pair of pickup windings 92 and 94 are disposed in the segments on the opposite sides of the center baffle 98.

It may be seen that these two windings 92 and 94 are substantially coaxial with the slug 86. In addition, the windings 92 and 94 are preferably positioned substantially symmetrically about slug 86 when the slug 86 is in the position corresponding to the diaphragm 34 being in its neutral position, i.e., zero pressure differential. If the bobbin 72 consists of a non-magnetic material such as a stainless steel, the inductance of each coil 92 and 94 will be a function of the volume of the slug 86 disposed within the coils. The two coils 92 and 94 are preferably arranged so that they will be balanced against each other when the slug 86 is in its neutral position.

Although the coils 92 and 94 may be made from copper wire, it should be noted that when subjected to radiation, copper becomes radioactive. As a result, copper wire changes its various electrical characteristics such as resistance, etc., after exposure to radioactivity. If the pressure-sensitive device 10 is to be employed in an environment of high radiation, it is desirable to employ a wire that is substantially transparent to radiation. By way of example, the coils 92 and 94 may be wound from aluminum wire.

It should also be noted that insulators of the normal or conventional variety deteriorate rapidly when they are exposed to radioactivity. Accordingly, it is desirable for the aluminum wire to be insulated by a suitable ceramic material which will maintain its insulating qualities at temperatures in excess of 1000° F. and in the presence of high radioactivity. A suitable material and method of applying the material to a wire is disclosed in copending application Serial No. 51,071 filed on August 22, 1960 by John A. Earl and assigned of record to Physical Sciences Corporation. As described in the copending patent application, the coating may consist of a mixture by weight of lead oxide from 70 to 75 percent, silicon dioxide from 10 to 14 percent, bismuth trioxide from 7 to 14 percent, and from 4 to 6 percent of any one of barium oxide, lanthium trioxide, magnesium oxide, calcium oxide and zinc oxide.

The various ingredients of the mixture are thoroughly mixed and smelted until homogenized at a temperature of approximately 2100° F. The mixture is then quenched in water and ground until it can pass through a fine mesh screen. The finely ground mixture is then coated on the aluminum wire and fired to a suitable firing temperature between 1000° F. and 1200° F. until the material is cured. The resistivity of the coating at room temperature is on the order of $1 \times 10^{14}$ ohms.

The coating will adhere very tenaciously to the wire and prevent any leakage between the successive turns of wire. In addition, the coating is flexible and may be bent without cracking or peeling. It will thus be seen that the wire may be wound onto the bobbin after it is coated without destroying its insulating qualities.

An insulating coating of this type is substantially unaffected by nuclear flux because it has a low thermoneutron capture cross-section on the order of only 30 barns. In addition, the coating maintains its electrical insulation at temperatures in excess of 1000° F.

After the coils 92 and 94 have been wound upon the bobbin 72, the ends of the coils may be extended through the baffles 98 and 100 to the outlet 16. The outlet 16 is formed on the end of the bushing 76 as an integral structure. In the present instance the outlet 16 includes a socket 102 having a base 104 which abuts against and is secured to the end of the bobbin 72. The exterior of the socket 102 is threaded so as to receive a connector and retain it in position.

A plurality of pins 106 are provided which extend through openings in the base 104. The pins 106 are electrically interconnected with the windings 92 and 94 on the bobbin 72. The pins 106 may be retained in position by means of ceramic plugs 108. The plug 108 may consist of the same material employed to coat the wire in the coils 92 and 94.

In order to assemble the present pressure sensitive device 10, normally the magnetically permeable slug 86 will be first attached to the connector 90 in the center of the diaphragm 34. The diaphragm 34 will then be positioned between the rim 32 on the body 18 and the retainer 46. When these members are all properly positioned, they may be fastened together by any suitable means such as a weld which extends circumferentially around the entire junction 50 between the two members. Following this, the housing 52 may be placed on the body 18 and retainer 46 and secured thereto. The passage 26 in the first nipple will interconnect with the chamber 36 on one side of the diaphragm 34 and the passage 62 within the second nipple 56 will communicate with the second pressure chamber 44.

At about the same time, the bobbin 72 may be prepared so that it will include the two windings 92 and 94 and the outlet 16. The outlet 16 is also secured on the bobbin 72 and the pins 106 connected to the windings 92 and 94. The bushing 76 is then fitted over the bobbin 72 and moved against the base 104 of the socket 102. The end of the bushing 76 and the bobbin 72 are then secured together by means of an annular weld. Following this, the bobbin 72 and bushing 76 are fitted into the housing 52 by sliding them into the passage 54. Simultaneously, the slug 86 will move into the passage 74 and inside of the windings 92 and 94.

The bushing 76 may be adjusted axially of the passage 74 until the slug 86 is properly centered between the two windings 92 and 94. Normally, this will be determined by applying suitable signals to the windings 92 and 94 and then moving the bushing 76 axially until the signals from the two windings 92 and 94 are balanced. After being precisely positioned, the flange 84 on the bushing 76 is welded onto the end of the housing 52. It can be appreciated that at this point, the pair of windings 92 and 94 will be symmetrically disposed with respect to the slug 86. Following this, if it is desired, an outer cover 107 may be placed around the bushing 76 and secured to the end of the housing 52.

In order to utilize this pressure sensitive device 10, the first inlet 12 is interconnected with the source of first pressure and the second inlet 14 is interconnected with the source of second pressure. A suitable electrical connector may then be inserted into the socket 102 so that the two windings 92 and 94 will be electrically interconnected with suitable signal sources. If the pressure in the two chambers 36 and 44 are identical, the diaphragm 34 will be undistorted and will remain in substantially the same position as shown in FIGURE 1. If the bobbin 72 has been properly placed, the two coils 92 and 94 will be symmetrically disposed about the slug 86. As a consequence, the signals from the two coils 92 and 94 will be equal and their sum will produce a zero signal. When the pressures between the two chambers 36 and 44 differ, the diaphragm 34 will be moved laterally one way or the other and particularly toward the chamber having the lowest pressure. This will cause the slug 86 to move axially of the passage 74 and relative to the windings 92 and 94 by the same amuont. As the position of the slug 86 changes, the inductances of the two windings 92 and 94 will change. The windings 92 and 94 having the largest portion of the slug 86 will have the largest inductance and the winding having the slowest portion of the slug 86 will have the lowest inductance. By interconnecting the two windings 92 and 94 in a bridge circuit similar to FIGURE 2, the two inductances of the two windings 92 and 94 become unequal, the bridge circuit will become unbalanced. As a result, a signal will be produced by the bridge that will linearly indicate the amount of unbalance between the two pressures.

It should be noted that the foregoing structure is substantially linear and its various characteristics will remain virtually constant over temperature ranges extending from the so-called cryogenic region to in excess of +1000° F. However, there will be a few changes such as in the resistances of the coils 92 and 94 and the permeability of the slug 86. In addition, although the materials of the various parts and their dimensions are chosen so that the changes in dimensions from thermal changes will be balacned, there will be some thermal distortions over a range from −325° or lower to +1000° or higher. In addition, as the temperature of the diaphragm 34 changes over such a wide range, the diaphragm 34 will tend to buckle or distort out of its ideal position. This will cause the center of the diaphragm 34 to move relative to the rim 32. This, in turn, will cause the slug 86 to be erroneously positioned relative to the two coils 92 and 94.

In order to compensate for the foregoing factors, a pair of compensating windings 110 and 112 may be provided on the opposite ends of the bobboin 72 in the sectors formed by the baffles 96 and 100. These windings 110 and 112 are interconnected with the pickup windings 92 and 94 and are the temperature of the pressure sensitive device. Some characteristics of these windings such as their resistances vary as a function of temperature. As a consequence, the coils will be effective to compensate for the thermal distortions, etc., of the pressure sensitive device that would otherwise tend to induce an error.

The magnitude of the difference signal from the two windings 92 and 94 is determined by the difference between their impedances and is determined primarily by the position of the slug 86. An A.C. signal in the windings 92 and 94 produces eddy currents, counter electromotive forces, core losses, etc. in the bobbin 72. These effects at least partially determine the inductance of the coils 92 and 94. As a result, the inductances of the windings 92 and 94 are also determined in part by the electrical resistance of the material in the bobbin 72. Since the electrical and magnetic characteristics of the bobbin 72 and of the slug 86 change with temperature, the inductances of the windings 92 and 94 are not totally independent of temperature. In addition, changes in temperature may produce variations in the resistance of the windings 92 and 94. This, in turn, will also effect the accuracy of the difference signal.

To eliminate or reduce errors resulting from variations in temperature, the materials employed in the windings 92 and 94, bobbin 72 and core 86 may be selected to neutralize or balance each other. This will permit the error producing changes in the resistance of the windings 92 and 94 to be substantially equal and opposite to the error producing changes in resistance, etc. of the bobbin 72. More particularly, the wire employed in the windings 92 and 94 may be provided with a resistance which will vary with temperature and produce a compensating signal of a first magnitude and polarity. The materials selected for the bobbin 72 will produce a second compensating signal of the same magnitude but of opposite polarity.

By way of example, the bobbin 72 may employ a material or alloy such as 80–20 Ni–Cr. In addition, the wire employed in the windings 92 and 94 may be provided with a negative coefficient of thermal changing resistance. Thus, for extended range of temperatures, variations in the characteristics of the bobbin 72 will be completely balanced by the changes in the windings 92 and 94.

It should be noted that under some circumstances, the characteristics of the diaphragm 34 and the amount of deflection thereof may vary as a function of the temperature. If so desired, the compensating signal produced by the windings 92 and 94 and the compensating signal produced by the variations in the bobbin 72 may be made unequal to provide a resultant signal. By a proper choice of materials, the resultant signal will precisely compensate for variations in the characteristics of the diaphragm 34. This will be effective to further reduce any errors resulting from temperature changes to a negligible level over an extended range of temperatures.

It has been found that there are some variations between successive pressure sensitive devices where a large number of them are produced. In this event, it has been necessary to replace the compensating windings 110 and 112 with suitable compensators 114 and 116 that are disposed adjacent the end of the bobbin 72, as shown in FIGURE 3. Thus, after the pressure sensitive device 10 is assembled and tested, the compensators 114 and 116 may be added to exactly balance the characteristics of that particular device 10. These compensators 114 and 116 are interconnected with the windings 92 and 94 to form a bridge such as seen in FIGURE 2. These compensators 114 and 116 may be resistors having different temperature coefficients so that as the temperature varies they will unbalance the bridge at the correct rate to compensate for the other effects of the temperature change.

While only two embodiments of the present invention are disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. A pressure transducer for providing an electrical signal proportional to the difference between the pressures of two fluids over an extended temperature range, said transducer including:
   a pressure-sensitive diaphragm having an annular periphery and a flexible center portion resiliently deflectable through a distance proportional to the pressure differential across the diaphragm,
   a pair of housing disposed on the opposite sides of the diaphragm and hermetically sealed to the periphery of the diaphragm to form first and second compartments, at least one of said housings including a portion that encloses an extension of one of the compartments,
   means for interconnecting the compartments with said fluids whereby the diaphragm will have a force thereon proportional to the difference between the pressures whereby the center portion of the diaphragm will be displaced relative to said extension proportional to the pressure differential,
   a magnetic core disposed in said extension and interconnected with said diaphragm so as to move therewith,
   a pair of differential windings on said extension, said windings being inductively coupled to the core so as to be responsive to the position of the core,
   and means connected to the pair of differential windings for compensating for any changes in the characteristics of the windings and the diaphragm and the core through the extended temperature range.

2. A pressure transducer for providing an electrical signal proportional to the differences between the pressures of two fluids over an extended temperature range, said transducer including:
   a pressure-sensitive diaphragm having an annular periphery and a flexible center portion, said center portion being resiliently deflectable normal to the plane of the periphery through a distance proportional to the amount of the pressure differential across the diaphragm,
   a first housing member having a face engaging the first side of said periphery to form a first compartment on the first side of the diaphragm,
   a second housing member having a face engaging the second side of said periphery to form a second compartment on the second side of the diaphragm,
   a hermetic seal joining the periphery of said diaphragm to both of the housing members,
   a member hermetically sealed to the first housing member, said last member including a dead end passage opening into the first compartment and at substantially right angles to the plane of the diaphragm,
   means for interconnecting the first compartment with the first of said fluids whereby the diaphragm will have a force on its first side proportional to the pressure of the first fluid,
   means for interconnecting the second compartment with the second of said fluids whereby the diaphragm will have a force on its second side proportional to the pressure of the second fluid,
   a magnetically permeable core disposed in said passage and interconnected with the center portion of the diaphragm to move axially of the passage with movement of the diaphragm,
   a pair of differentially connected windings disposed in magnetically coupled relationship to the core and responsive to the axial position of the core to produce an electrical signal proportional to the pressure differential,
   and means electrically connected to the pair of differentially connected windings for compensating for any changes in the characteristics of the windings and the diaphragm and the core through the extended temperature range.

3. A pressure transducer for providing an electrical signal proportional to the differences between the pressures of two fluids over an extended range between $-325°$ F. and $1000°$ F., said transducer including:
   a pressure-sensitive diaphragm having an annular periphery and a flexible center portion, said center portion having a neutral position when there is no pressure differential across the diaphragm, said diaphragm being corrugated, said diaphragm being resiliently deflectable from said neutral position in a direction normal to the plane of the periphery and through a distance proportional to the amount of the pressure differential across the diaphragm,
   a first housing member having a face engaging one side of said periphery to form a first compartment on one side of the diaphragm, the first housing member also having a surface facing the diaphragm with corrugations corresponding to the corrugations in the diaphragm,
   a second housing member having a face engaging the opposite side of said periphery to form a second compartment on the other side of the diaphragm, the second housing member also having a surface facing the diaphragm with corrugations corresponding to the corrugations in the diaphragm, said housing members being hermetically sealed to the periphery of said diaphragm and to each other, a non-magnetic bobbin having a dead end passage extending axially thereof, said bobbin being mounted on the first housing member with the open end of the dead end passage communicating with the first compartment, means for interconnecting the compartments with said fluids whereby the diaphragm will have a pressure differential thereacross proportional to the pressure differential of the fluids, a magnetically permeable core disposed in said passage and movable axially thereof, means mechanically interconnecting the core with the center portion of the diaphragm to axially position the core in the passage in proportion to the position of the diaphragm, said core having a neutral position in said passage when the diaphragm is in the neutral position, a pair of differential windings on the outside of said bobbin concentric with the passage, said windings being responsive to the axial displacement of the core from a center between said windings, means for hermetically sealing said bobbin to the first housing member with said center of the windings symmetrically disposed about the neutral position of said core, and means connected to the pair of differential windings for compensating for any changes in the characteristics of the windings and the diaphragm and the core through the extended temperature range.

4. A pressure transducer for providing an electrical signal proportional to the difference between the pressures of two fluids having temperatures that vary over an extended range between −325° F. and 1000° F., said transducer including:

a pressure-sensitive diaphragm having an annular periphery and a flexible center portion movable through a distance proportional to the pressure differential across the diaphragm, the diaphragm being corrugated, at least one housing hermetically sealed to the periphery of the diaphragm to form a pair of compartments on the opposites of the diaphragm, the comments on the opposite side of the diaphragm, the compartments being defined in part by corrugated surfaces against the diaphragm where the corrugations in the surfaces correspond to the corrugations in the diaphragm to limit the displacement of the diaphragm to particular limits, means for interconnecting the first of the compartments with the first of said fluids whereby the center portion of the diaphragm will be urged in a first direction in proportion to the pressure of the first fluid, means for interconnecting the second of the compartments with the second of said fluids whereby the center portion of the diaphragm will be urged in a second direction in proportion to the pressure of the second fluid, a core hermetically sealed in one of said compartments and movable with the center portion of the diaphragm, said core having a magnetic permeability that is substantially constant over an extended temperature range, a pair of windings disposed outside of said housings and inductively coupled to the core and differentially connected to be responsive to the position of the core, and means operatively connected to the pair of windings for cooperating with the windings to compensate for any changes in the parameters of the windings and the diaphragm and the core over the extended temperature range.

5. A pressure transducer for providing an electrical signal proportional to the difference between the pressures of two fluids having temperatures that vary over extended ranges between −325° F. and 1000° F., said transducer including:

a pressure-sensitive diaphragm having an annular periphery and a flexible center portion resiliently deflectable through a distance proportional to the pressure differential across the diaphragm, the diaphragm being provided with corrugations, a pair of housings disposed on the opposite sides of the diaphragm and hermetically sealed to the periphery of the diaphragm to form first and second compartments, at least one of said housings including a portion that encloses an extension of the compartment on its side of the diaphragm, the housings being provided adjacent the diaphragm with corrugated surfaces corresponding to the corrugations of the diaphragm to receive the diaphragm upon a displacement of the diaphragm beyond particular limits, means for interconnecting the compartments with said fluids whereby the diaphragm will have a force thereon proportional to the difference between the pressures whereby the center portion of the diaphragm will be displaced relative to said extension proportional to the pressure differential, a stainless steel core disposed in said extension and interconnected with said diaphragm so as to move therewith, said steel having a magnetic permeability that remains substantially constant over said temperature range, a pair of differential windings on said extension, said windings being inductively coupled to the core so as to be responsive to the position of the core, and means connected to the pair of differential windings for compensating for any changes in the characteristics of the windings and the diaphragm and the core over the extended temperature ranges.

6. A pressure transducer for providing an electrical signal proportional to the differences between the pressures of two fluids having temperatures that vary over extended ranges between −325° F. and 1000° F., said transducer including:

a pressure-sensitive diaphragm having an annular periphery and a flexible center portion, said center portion being resiliently deflectable normal to the plane of the periphery through a distance proportional to the amount of the pressure differential across the diaphragm, the diaphragm being corrugated, a first housing member having a face engaging one side of said periphery to form a first compartment on that side of the diaphragm, the first housing member being provided adjacent the diaphragm with a surface corrugated in accordance with the corrugations of the diaphragm to receive the diaphragm upon a displacement of the diaphragm in a first direction beyond particular limits, a second housing member having a face engaging the opposite side of said periphery to form a second compartment on that side of the diaphragm, the second housing member being provided adjacent the diaphragm with a surface corrugated in accordance with the corrugations of the diaphragm to receive the diaphragm upon a displacement of the diaphragm beyond particular limits in a second direction opposite to the first direction, a hermetic seal joining the periphery of said diaphragm to the housing members, a non-magnetic bobbin hermetically sealed to the first housing member, said bobbin including a dead end passage opening into the first compartment and at substantially right angles to the plane of the diaphragm, means for interconnecting said compartments with said fluids whereby the diaphragm will have a force thereon proportional to the pressure differential, a stainless steel core disposed in said passage and interconnected with the center portion of the diaphragm to move axially of the passage in response to movement of the diaphragm, said stainless steel having a magnetic permeability that is substantially constant over the entire range of temperatures, a pair of differentially connected windings enveloping said core and formed from aluminum and responsive to the axial position of the core to produce an electrical signal proportional to the pressure differential, and means electrically connected to the pair of differentially connected windings for compensating for any changes in the characteristics of the differentially connected windings and the diaphragm and the core over the extended temperature range.

References Cited by the Examiner
UNITED STATES PATENTS

| | | | |
|---|---|---|---|
| 2,667,786 | 2/1954 | Spaulding | 73—398 |
| 2,999,386 | 9/1961 | Wolfe | 73—298 |
| 3,044,029 | 7/1962 | Pegram | 336—30 |
| 3,153,935 | 10/1964 | Karlson | 336—30 X |
| 3,183,126 | 5/1965 | Curtis et al. | 336—179 X |

LEWIS H. MYERS, *Primary Examiner.*

JOHN F. BURNS, LARAMIE E. ASKIN, *Examiners.*

D. J. BADER, T. J. KOZMA, *Assistant Examiners.*